(No Model.)

C. M. SPENCER.
NAIL PULLER.

No. 480,974. Patented Aug. 16, 1892.

Witnesses.
Hilmer Svensen
Orlando Sheldon

Inventor.
Christopher M. Spencer
By James Shepard
Atty.

UNITED STATES PATENT OFFICE.

CHRISTOPHER M. SPENCER, OF WINDSOR, CONNECTICUT.

NAIL-PULLER.

SPECIFICATION forming part of Letters Patent No. 480,974, dated August 16, 1892.

Application filed August 11, 1891. Serial No. 402,357. (No model.)

*To all whom it may concern:*

Be it known that I, CHRISTOPHER M. SPENCER, a citizen of the United States, residing at Windsor, in the county of Hartford and State of Connecticut, have invented certain new and useful Improvements in Nail-Pullers, of which the following is a specification.

My invention relates to improvements in nail-pullers; and the object of my improvement is to increase the efficiency and utility of the implement.

Figure 1:
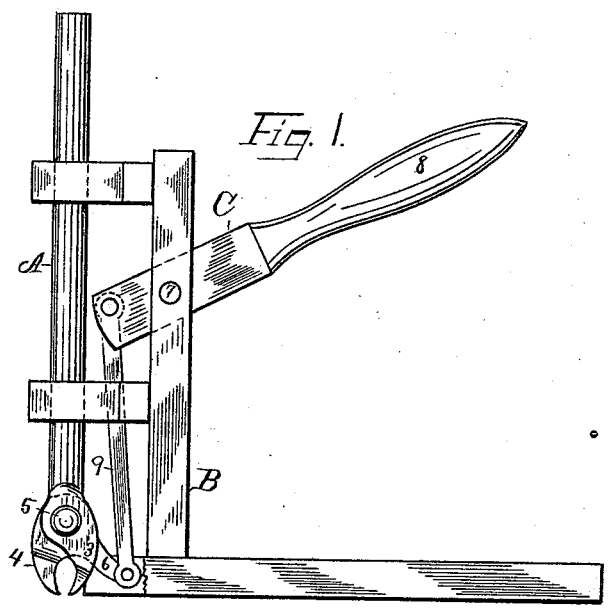
Figure 2:
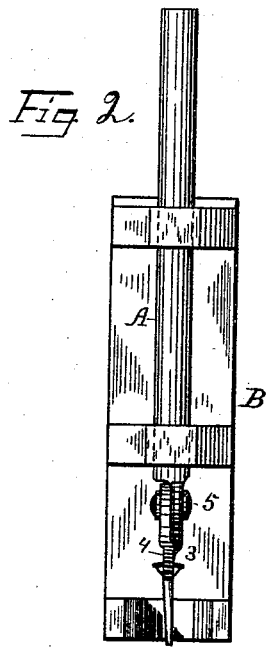

In the accompanying drawings, Figure 1 is a side elevation of my puller, a portion of the base being broken away in order to better show the jaws; and Fig. 2 is a front elevation of the same with the jaws raised and a spike within them.

A designates a slide in the form of a solid rod, on the lower end of which is formed a rigid jaw 3. A movable jaw 4 is pivoted thereto by the bolt or rivet 5. This movable jaw is provided with a rigid shank 6, which, in connection with said jaw, forms a lever, said shank constituting the operating device for opening and closing the jaws.

B designates a frame, on the upright portion of which said slide is mounted, so as to move up and down in a right line. A lever C is fulcrumed on the frame at 7, with the short end near the slide and the long end projecting from the frame to form the handle 8. A link 9 is pivoted by one end to the short arm of the lever and by the other end to the jaw-operating device—that is, the shank 6 of the movable jaw—whereby said jaw is operated by a combined lever and link.

The implement is placed with the jaws over the nail to be pulled and by driving upon the slide the jaws may be forced into the wood by the sides of the nail. The handle 8 of the lever C is then depressed to lift the link, which, pulling on the jaw-operating device, closes the jaws firmly upon the nail, and when they can close no more it lifts the jaws and slide bodily in a right line, drawing the nail with them, and thereby pulling it straight out without bending it in the least.

I have shown the slide in the form of a plain rod designed to be driven by direct blows of a hammer; but, if desired, it may be provided with any of the well-known rammers or driving devices of ordinary nail-pullers.

The jaws which I have shown and their operating device or shank 6 are, when separately considered, old, the ordinary manner of using them for pulling nails being to rock the implement with the shank resting on some support and serving as the fulcrum.

There are many other forms of pivoted jaws known in nail-pullers that may be substituted in my puller for the specific form of jaws which I have shown, and when so substituted will be considered an equivalent therefor.

I claim as my invention—

1. The combination of a frame, a slide mounted thereon, a pair of jaws mounted to move with said slide, one of which is provided with a rigid shank, and a lever connected with said shank for operating said jaws, substantially as described, and for the purpose specified.

2. The combination of a frame, a slide mounted thereon, a pair of jaws mounted to move with said slide, a jaw-operating device, and a combined lever and link connected with said jaw-operating device, substantially as described, and for the purpose specified.

CHRISTOPHER M. SPENCER.

Witnesses:
M. C. MILLS,
M. E. BAIRD.